July 3, 1928.
H. S. PALMER
CONCRETE BUILDING BLOCK AND METHOD OF MAKING SAME
Filed March 22, 1927

1,676,153

Inventor
Harmon S. Palmer,
By Chas. J. Williamson
Attorney

Patented July 3, 1928.

1,676,153

UNITED STATES PATENT OFFICE.

HARMON S. PALMER, OF WASHINGTON, DISTRICT OF COLUMBIA.

CONCRETE BUILDING BLOCK AND METHOD OF MAKING SAME.

Application filed March 22, 1927. Serial No. 177,412.

My invention relates particularly to what is known as concrete building blocks which are blocks made from a mixture of cement and sand in a mold, the mold being usually a part of a machine, and the blocks after being molded being removed by means of pallets on which they are allowed to stand until the concrete has sufficiently set or hardened. Of course, a great many pallets must be provided for use with one machine, and these pallets are made of iron or steel, and are, therefore, a considerable item of expense. Concrete blocks as ordinarily made are unsatisfactory because of their capacity to absorb moisture with the result that walls built of them may be damp as a result of rainy weather. The object of my invention is two-fold. It is to cheapen the cost of production by eliminating the necessity for use of pallets, and to improve the block by making it water-proof and by utilizing to the utmost the cement by hydration, or to a more complete extent than has heretofore been possible. My invention consists in whatever is described by or is included within the terms or scope of the appended claims.

Figure 1:
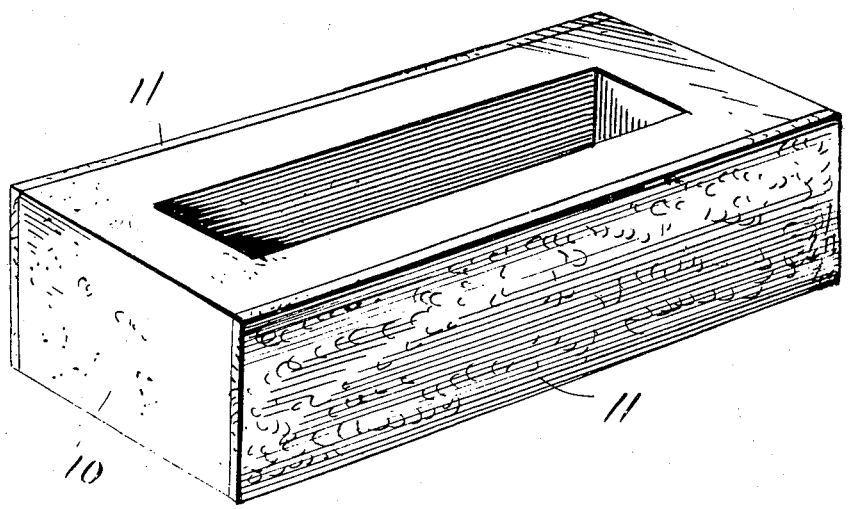
Fig. 1 is a perspective view of a concrete block made in accordance with my invention.
Figure 2:
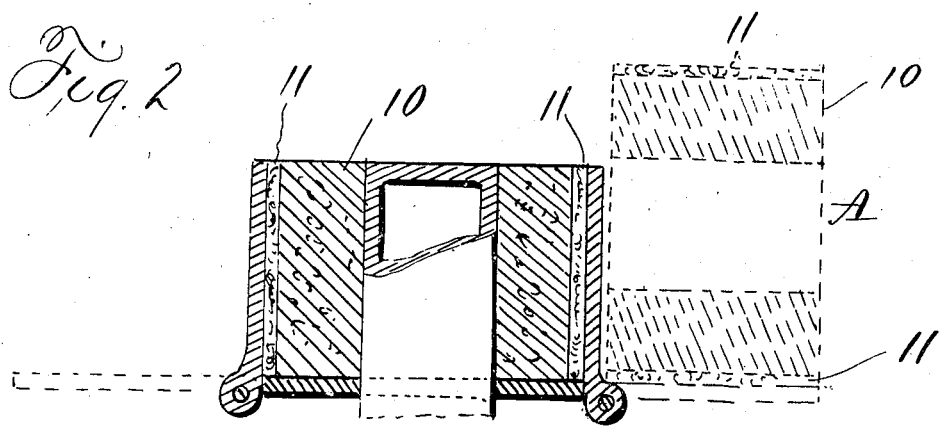
Fig. 2 is a cross section thereof showing the two positions of the block in the molding thereof, as in an ordinary molding machine, and when removed from the machine for setting or hardening.

The block, 10, shown in the drawings to illustrate the practice of my invention is of the well known hollow oblong form made in the well known machine which has hinged side walls that form the mold and a vertically movable plunger or core for the production of the internal recess or chamber that extends from top to bottom of the block. Upon what is one of the vertical faces of the block when used in building a wall, and which is on the interior of the building or structure, is a layer, 11, of fairly thick material which covers that entire surface of the block, and which is made from sugar cane fibre. I use this material not only because of its toughness, and its water-proof and heat insulating properties, but because I have found that without the employment of any special adhesive or cement, it will so firmly and intimately unite with the cement of which the block is made, that a union between them is secured that is as tight or firm as if the two materials were parts of a homogeneous body with enough tensile strength at the plane of union as to withstand all the strains tending to separate them or tear them apart to which the block is apt to be subjected. The layer in the form of a thick sheet of the proper dimensions is placed in the mold before the hydrated mixture of cement and sand is placed in the mold and tamped, and the block with its surface layer as shown in Fig. 2 at A is then turned through ninety degrees to place the layer, 11, undermost, and supported by such layer as a substitute for a pallet is removed to the place for setting or hardening of the block. It will thus be seen that no pallet as a separate element or member need to be used, and thus a large saving in cost of manufacture is secured. I have found that with the layer of sugar cane fibre more water can be used in the concrete mix, and thus very complete hydration of the cement is possible, which is important in utilizing to the utmost the cement in the block. The layer itself, since it presents a neat and attractive appearance may be left as the interior finish of the wall, or it may be covered by plaster, its property of being a good nail-holding material contributing to or facilitating that treatment.

It is possible to use a mold for making solid blocks in which no core is used, and in that case the layer or lamination of fibre will be placed at the bottom of the mold and no turning over of the block as described hereinbefore will be necessary.

Prior to my present invention, in making blocks of concrete in a collapsible machine or mold it has been necessary to use a mixture of sand and cement with less water than the cement should have in order to get the full strength which can be secured from proper hydration. With proper hydration, the mixture would be so plastic it will not hold a rigid shape while being lifted from the machine on the iron pallet provided for the purpose. To overcome this deficiency of water, resulting from using only sufficient to make a tamping mixture, it has been necessary when the block has been removed on the iron pallet and is set or partly cured, to add more water, perhaps several times, but this make-shift will never give the strength it would have if given in the first place. Not only does this practice result in causing great loss of cement but it causes a serious defect in the product in that it leaves the block comparatively spongy and porous and thus not waterproof.

By my invention, in addition to the mold-box I employ what may be considered an auxiliary side-plate placed against the side of the mold-box before the mixture is put in, which is made or fabricated from crushed sugar-cane as hereinbefore explained. There may be only one such auxiliary plate, or one on each side of the block or it may be a continuous sheet extending clear around the mold box, depending upon the state or condition of the mixed material; but in any case this plate or sheet bonds with the concrete and supports the block while being removed. If desired, the single side plates may be used simply as pallets, and as they cost no more than one tenth of the iron pallets I effect a large saving of expense in factory equipment because of the great number and cost of the metal pallets.

Heretofore the great objection to concrete buildings (especially dwellings) as well as brick and stone is the fact that they are colder and more damp than wooden houses, and a remedy has been sought for years without success. By my invention the same sheet material used so effectually in producing the block, and so thoroughly bonded to it as to become a part of it, because of its cellular nature, serves as an insulation from heat and cold and protection against dampness when left on the block and incorporated with it in the structure. It provides in itself a pleasing effect or finish, but it will take another finish, such as a thin coat of plaster, or paper, or paint.

I have long sought to overcome the above mentioned difficulties in the use of concrete building blocks (and I speak out of many years of practical experience, having been one of the first to patent and introduce them) but I found no satisfactory remedy until I used the material before mentioned. This is of strong, stiff "artificial lumber", with coarse pin-like fiber, and of a naturally adherent nature so that the bond between it and the concrete is so strong as to make virtually one solid building unit, the union being contributed to by the weight of the block pressing down on the pallet of this material in the curing process.

What I claim is:

1. A concrete building block having a lamination of sugar cane fibre joined thereto by the cement of the block the lamination having an adherent nature.

2. The method of making concrete blocks having a lamination of fibrous material in sheet form which consists in molding the concrete mixture with one side in contact with such sheet, and then causing the setting or hardening to take place with such sheet lowermost.

3. In the manufacture of concrete building blocks, the method which consists in placing within a mold box a layer of sheet material of fibrous and adherent nature, causing the contact therewith of the concrete mixture in a plastic state, removing the same from the box, and resting the plastic mass on said layer for curing.

4. In the manufacture of concrete building blocks the combination with the mold-box, an auxiliary side-plate within the mold composed of cellular material having an adherent nature adapted to bond with the concrete, and removable with the plastic mass from the mold.

5. In the manufacture of concrete building blocks, the combination with a mold-box, a pallet of fibrous material with which the concrete block contacts and which is removable with the block and forms a support for it.

6. The method of making concrete blocks which consists in placing the concrete mixture in a mold and then causing the setting or hardening to take place with a sheet of sugar cane fiber that is of an adherent nature in contact with one of the side surfaces of the block.

7. The method of making concrete blocks having a lamination of fibrous material in sheet form which consists in placing the concrete mixture in a mold and then causing the setting or hardening to take place with such sheet in contact therewith under pressure.

In testimony whereof I hereunto affix my signature.

HARMON S. PALMER.